United States Patent Office 3,361,764
Patented Jan. 2, 1968

3,361,764
CHLORINATED ACYLMETHYLENE DITHIOLES AND THEIR PREPARATION
Erwin Klingsberg, Mountainside, N.J., assignor to American Cyanamid Company, Stamford, Conn., a corporation of Maine
No Drawing. Filed Dec. 22, 1965, Ser. No. 515,746
4 Claims. (Cl. 260—327)

This invention relates to a novel class of dithiole compounds and to a method for preparing the same. More particularly it relates to chlorinated acylmethylene dithioles especially acylmethylene 4-phenyl-1,2-dithioles, substituted by a chlorine atom on a carbon atom alpha to the carbonyl group. These compounds are monochlorination products of acylmethylene dithioles of structure

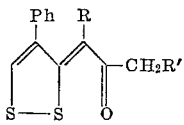

in which Ph is a phenyl group, and R and R' are selected from the group consisting of hydrogen and phenyl. These compounds are characterized by absorption in the visible region of the spectrum and are useful as yellow colorants for thermoplastic materials.

The acylmethylene dithiole starting materials may be prepared by condensing a 4-phenyldithiolium salt with a dialkyl ketone or alkyl benzyl ketone and dehydrogenating as shown in Equations I–IV of the following diagram. Such preparations are fully described in applicant's U.S. Patent, No. 3,211,749, issued Oct. 12, 1965 and also in his publication, J. Am. Chem. Soc. 85, 3244 (1963).

The compounds of this invention are prepared by chlorination of acylmethylene dithioles, as shown in Equations V and VI of the diagram.

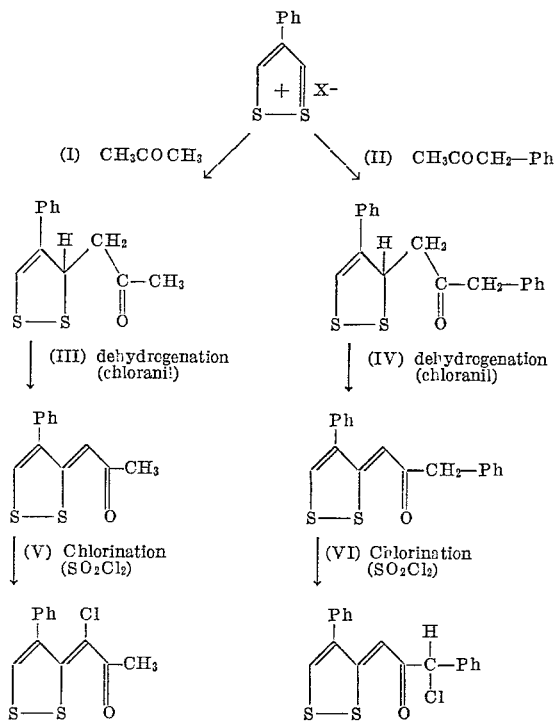

In these equations Ph represents phenyl and X⁻ represents an anion derived from a strong acid, such as sulfuric, hydrochloric, etc.

In accordance with the present invention the chlorination of the acylmethylene dithiole compound is carried out in a non-polar organic solvent inert to chlorinating agents and preferably of relatively low boiling point, such as dichloromethane, dichloroethane, chloroform, carbon tetrachloride, benzene or ethyl bromide. A mild chlorinating agent should be used, such as chlorine or preferably sulfuryl chloride. The product is isolated by evaporation and recrystallized from a suitable solvent, such as a low molecular weight aliphatic alcohol, hexane, etc.

The following examples are presented to illustrate the invention. Degrees of temperature are in centigrade.

*Example 1.—Preparation of starting material, 4,6-epidithio-5-phenyl-3,5-pentadienone-2*

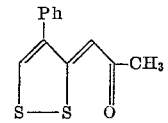

4-phenyl-1,2-dithiolium hydrogen sulfate (10.0 g., 0.036 mole) [E. Klingsberg, J. Am. Chem. Soc., 83, 2936 (1961)] is refluxed for two and one-half hours in 750 ml. of acetone and 550 ml. of isopropyl alcohol. Chloranil (8.8 g., 0.035 mole) is then added, refluxing continued one-half hour longer, and the mixture evaporated to dryness at room temperature. The orange product is isolated by Soxhlet extraction with petroleum ether or hexane and crystallized from isopropyl alcohol, M.P. 118–119°, yield 5.0 g. (60%).

*Analysis.*—Calcd. for $C_{12}H_{10}OS_2$: C, 61.5; H, 4.3; S, 27.4. Found: C, 61.2; H, 4.5; S, 27.1.

*Example 2.—3-chloro-4,6-epidithio-5-phenyl-3,5-hexadienone-2*

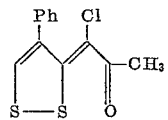

A solution of 0.81 ml. (1.35 g.; 0.0100 mole) of sulfuryl chloride in 3–4 ml. of dichloromethane is added at 0° to a solution of 2.34 g. (0.0100 mole) of the compound of Example 1 in 35 ml. of dichloromethane. The resulting solution is left overnight at room temperature and then evaporated to give 2.65 g. (99%) of brown product, M.P. 97–101°. Crystallization from 100 ml. of hexane gives 1.70 g. (63%) of orange-yellow needles, M.P. 101–5°. A second crystallization of the product raises the M.P. to 108–9°. Its absorptivity in the visible spectrum at 433 mμ=46.2 liters per gram centimeter. Its molar extinction coefficient ϵ=12,300.

*Analysis.*—Calcd. for $C_{12}H_9ClOS_2$: C, 53.6; H, 3.4; Cl, 13.2; S, 23.8. Found: C, 53.9; H, 3.6; Cl, 12.8; S, 23.9.

*Example 3.—1-chloro-4,6-epidithio-1,3,5-triphenyl-3,5-hexadienone-2*

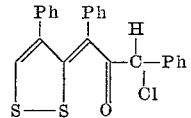

To a solution of 1.93 g. (5.0 millimoles) of 4,6-epidithio-1,3,5-triphenyl-3,5-hexadienone-2 [Compound IVg of E. Klingsberg, J. Am. Chem. Soc. 83, 3246 (1963)] in 15 ml. of ice-cold dichloromethane is added 0.41 ml. (0.69 g., 5.1 millimoles) of sulfuryl chloride. The solution is left overnight at room temperature and then evaporated to give 2.05 g. (97%) of brown solid, M.P. 155–8°. Methanol gives yellow crystals, M.P. 160–1°; the product also crystallizes from hexane. Its absorption peak, $\lambda_{max.}$ is at 445 mμ. Its absorptivity at 445 mμ is 43.2 liters per gram centimeter. Its molar extinction coefficient ϵ=18,200.

*Analysis.*—Calcd. for $C_{24}H_{17}ClOS_2$: C, 68.4; H, 4.0; Cl, 8.4; S, 15.2. Found: C, 68.5; H, 4.1; Cl, 8.6; S, 14.7.

*Example 4.—Utility as yellow colorants for thermoplastics*

To 100 parts of comminuted rigid polyvinyl chloride is added 2 parts of a dibutyl tin bis mercaptide heat stabilizer and 0.25 part of 2-hydroxy-4-methoxybenzophenone, a light stabilizer. The whole is milled on a 2-roll Thropp mill, one roll of which is steam-heated. When a workable molten mass is obtained, 1 part of the compound of Example 2 is added and the mill is run until all of the compound is in the plastic. The band is then cut at every pass for fifty or more passes until a uniformly yellow band is obtained. The mass is then compression-molded to give a 50 mil yellow plaque. The compound of Example 3 is similarly useful.

I claim:
1. A compound of the structure

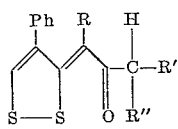

where R is hydrogen, phenyl or chlorine, R' is hydrogen or phenyl and R" is hydrogen or chlorine; one, and only one, of R and R" being chlorine.

2. The compound of claim 1 in which R is chlorine and R' and R" are each hydrogen.

3. The compound of claim 1 in which R and R' are each phenyl and R" is chlorine.

4. A process of preparing a compound of claim 1 comprising contacting an acylmethylene dithiole in a low boiling non-polar organic solvent inert to chlorination, with at least one molecular equivalent of sulfuryl chloride until formation of said compound is complete, and thereafter removing said solvent and recovering said compound.

References Cited

UNITED STATES PATENTS 2,657,216   10/1953   Gaudin _____ 260—327

JAMES A. PATTEN, *Primary Examiner.*